Apr. 24, 1923.
C. A. G. PRITCHARD
CONNECTING ROD FOR PISTONS
Filed Dec. 3, 1921
1,452,932
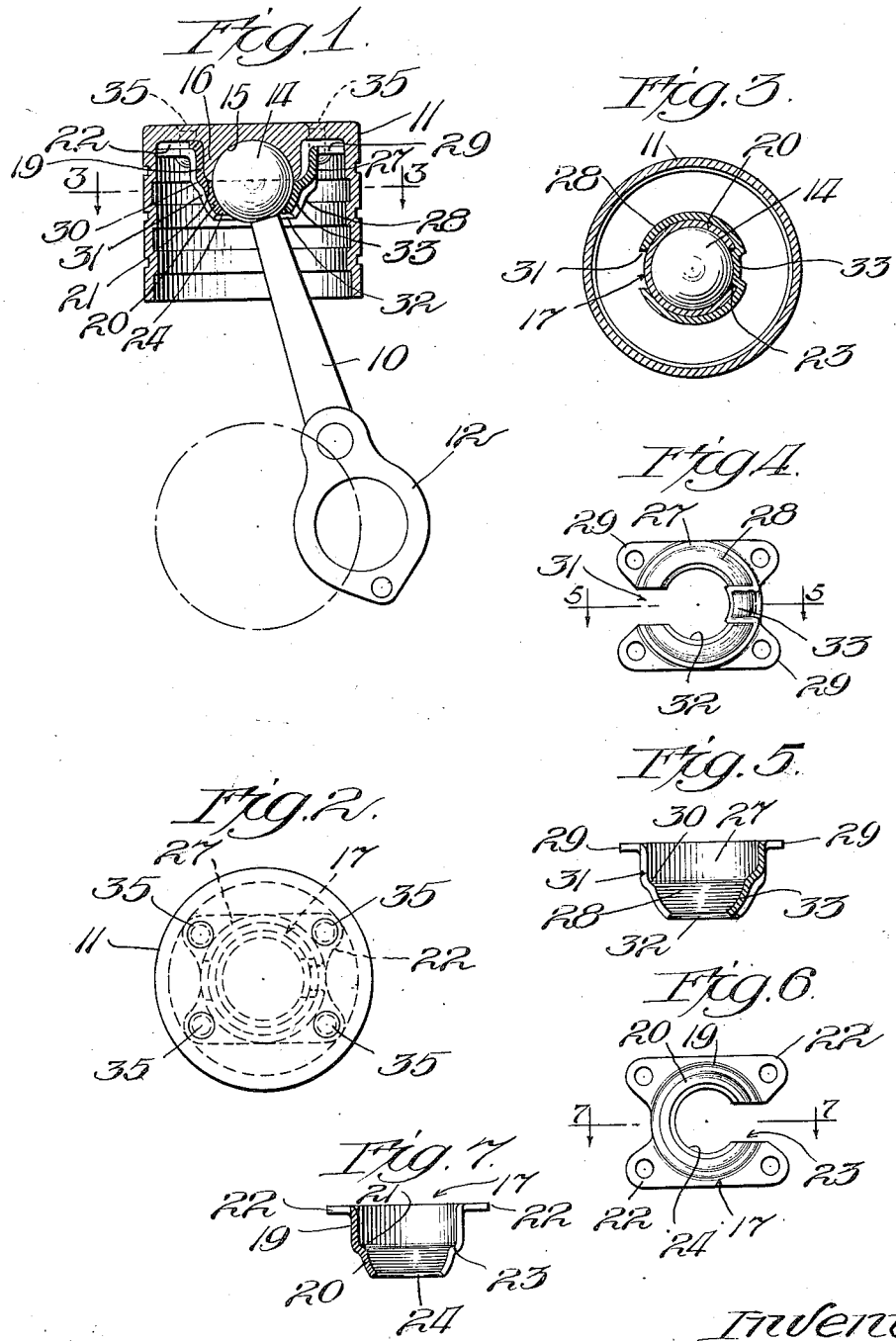
Inventor
Charles A. G. Pritchard
By Rector, Hibben, Davis & Macauley
Attys
Witness:
Harry S. Gaither Patented Apr. 24, 1923.

1,452,932

UNITED STATES PATENT OFFICE.

CHARLES A. G. PRITCHARD, OF CLEVELAND, OHIO, ASSIGNOR TO CHICAGO PNEUMATIC TOOL COMPANY, OF NEW YORK, N. Y., A CORPORATION OF NEW JERSEY.

CONNECTING ROD FOR PISTONS.

Application filed December 3, 1921. Serial No. 519,617.

*To all whom it may concern:*

Be it known that I, CHARLES A. G. PRITCHARD, a citizen of the United States, residing at Cleveland, in the county of Cuyahoga and State of Ohio, have invented certain new and useful Improvements in Connecting Rods for Pistons, of which the following is a specification.

My invention relates to connecting rods or pitmen for pistons and the main object thereof is to provide simple, efficient and durable means for connecting the outer ends of the rods with the pistons. The parts are preferably formed of stamped sheet metal which may be quickly and easily assembled and cheaply manufactured.

With the above and incidental objects in view, the invention consists in certain novel features of construction and combinations of parts, the essential elements whereof are recited in the appended claims, and a preferred form of embodiment of which is described in detail hereinafter and illustrated in full in the accompanying drawings, which form part of this specification.

Of said drawings, Fig. 1 is a central longitudinal section of a piston and connecting rod embodying my invention; Fig. 2 is a top plan of the piston; Fig. 3 is a section on the line 3—3 of Fig. 1; Fig. 4 is a bottom plan of the outer socket member or cap; Fig. 5 is a section on the line 5—5 of Fig. 4; Fig. 6 is a bottom plan of the inner socket member or cap; and Fig. 7 is a section on the line 7—7 of Fig. 6.

Referring to the drawings, the piston rod 10 is connected at its outer end to the head of the piston 11 by means embodying my present invention, and the inner end of the rod is connected with a bearing 12, which cooperates with the crank or wrist-pin, not shown in the drawings.

The outer end or head of the piston is provided with a ball or sphere 14 which is seated in a semi-spherical depression or seat 15 formed in a cylindrical boss 16 projecting inwardly from and preferably integral with the head of the piston. The ball end of the piston rod is retained in the seat 15 by an inner cap or socket member 17, which is preferably formed of sheet-metal, stamped by suitable dies to give it the desired shape and contour. The cap 17 comprises a substantially cylindrical central portion 19, a semi-spherical portion 20, a slightly in-set annular portion 21 between the cylindrical portion 19 and the spherical portion 20, and flanges or portions 22 projecting laterally from the end of the cylindrical portion. A slot 23 in one side of the cap communicates with a central opening 24 in the spherical portion 17 and through which the lower portion of the ball end 14 projects when the connecting rod and piston are in assembled relation. A second cap or socket member, shown in Figs. 4 and 5, is somewhat similar to the cap 17, being stamped from sheet metal to form a substantially circular portion 27, a semi-spherical portion 28, flanges or projections 29, a slightly in-set annular portion 30, a slot 31 and a central opening 32. The side of the cap diametrically opposite the slot 31 is crimped or bent inwardly to provide a semi-spherical inwardly-set portion 33, which is preferably of the same width as the slot 23 in the cap 17 and has the same curvature as the portion 20 of the cap 17.

In assembling the parts, the cap 17 is moved laterally with respect to the connecting rod so that the connecting rod passes through the slot 23 and into the central opening 24. The outer cap 26 is also moved laterally to position the piston rod within its central opening 32. When the projecting portion 33 of the cap 26 is in alignment with the slot 23 in the cap 17, the caps are moved so that the ball end of the piston rod is seated in and between the seat 15 and the socket portion 23 of the cap 17 and the socket portion 28 of the cap 26 seats against the spherical portion 20 of the cap 17. The caps are then secured to the head or end of the piston by means of rivets 35 which project through the aligned holes or apertures in the flanges 22 and 29 of the caps. It is obvious that screws may be used in p.ace of the rivets, in which case the disassembly of the parts, in case of wear or for replacement, is facilitated.

It will be observed that the projecting portion 33 of the outer cap fits snugly in and fills the portion of the slot 23 in the semi-spherical portion 20 of the cap 17 so that the semi-spherical seat formed by the caps is continuous. As the slots 23 and 31 are oppositely disposed, the outer cap 26 also serves to strengthen the inner cap and prevent any springing or distorting action of the inner cap which otherwise might occur because of the slot in the cap 17. The inner cap fits snugly over the spherical end of the connecting rod and the boss 16, while the outer cap is of a very similar contour but slightly larger so that it fits snugly over the inner cap.

It will be obvious to those skilled in the art that many changes in details of construction and arrangement of parts may be made without departing from the scope and spirit of the invention defined in the following claims.

I claim:

1. In a device of the class described, the combination of a piston rod having a head, a piston, a slotted socket cooperating with said head and fastened to said piston, and means for closing the slot in said socket.

2. In a device of the class described, the combination of a piston rod having a ball head, a piston having a semi-spherical seat cooperating with said head, a slotted member forming a semi-spherical socket also cooperating with said head and fastened to said piston, and means for closing the slot in said socket.

3. In a device of the class described, the combination of a piston rod having a head, a piston, a slotted socket cooperating with said head and having a laterally extending flange contacting with and fastened to the end of said piston, and means for closing the slot in said socket.

4. In a device of the class described, the combination of a piston rod having a head, a piston, a sheet metal member having a slot and forming a socket cooperating with said head and fastened to said piston, and a sheet metal member for closing said slot.

5. In a device of the class described, the combination of a piston rod having a head, a piston, a sheet metal member having a slot and forming a socket cooperating with said head and fastened to said piston, and a sheet metal member having a projecting portion coinciding with and closing said slot.

6. In a device of the class described, the combination of a piston rod having a head, a piston, a member having a slot and forming a socket cooperating with said head, and a superimposed member having an unaligned slot and a portion filling the slot in the first mentioned member.

7. In a device of the class described, the combination of a piston rod having a ball head, a piston, a sheet metal member having a slot and forming a semi-spherical socket cooperating with said head, a superimposed sheet metal member having an unaligned slot and a bent-in semi-spherical portion filling the slot in the first mentioned member.

8. In a device of the class described, the combination of a piston rod having a ball head, a piston having a semi-spherical seat cooperating with said head, a member having a slot, a substantially cylindrical portion around said seat and a semi-spherical socket cooperating with said head, and a member having a semi-spherical portion filling said slot.

9. In a device of the class described, the combination of a piston rod having a ball head, a piston having a semi-spherical seat cooperating with said head, a member having a slot, a substantially cylindrical portion around said seat and a semi-spherical socket cooperating with said head, and a member superimposed on said first mentioned member and having an unaligned slot and a portion filling the slot of the first mentioned member.

10. In a device of the class described, the combination of a piston rod having a ball head, a piston having a semi-spherical seat cooperating with said head, a member having a slot, a substantially cylindrical portion around said seat, and a semi-spherical socket cooperating with said head, a member superimposed on said second member and having an unaligned slot and a portion filling the slot of the first mentioned member, superimposed flanges on said members, and means for securing said flanges to the piston.

11. In a device of the class described, the combination of a piston, a piston rod having a ball head, and two caps, one fitting over the other and provided with unaligned slots, the inner cap having a semi-spherical portion forming a socket cooperating with said head and the outer one having a similar socket cooperating with the semi-spherical portion of the inner member.

12. In a device of the class described, the combination of a piston, a piston rod having a ball head, two caps, one fitting over the other and provided with unaligned slots, the inner cap having a semi-spherical portion forming a socket cooperating with said head and the outer cap having a similar socket cooperating with the semi-spherical portion of the inner member, and a portion on the outer cap projecting into said slot in the inner cap and cooperating with said ball head.

13. In a device of the class described, the combination of a piston, a piston rod having a ball head, two caps, one fitting over the other and provided with unaligned slots, the inner cap having a semi-spherical portion forming a socket cooperating with said head and the outer cap having a similar socket cooperating with the semi-spherical portion of the inner member, a portion on the outer cap projecting into said slot in the inner cap, and superimposed flanges on said caps by which the latter are fastened to said piston.

CHARLES A. G. PRITCHARD.